(Model.)

C. J. UNDERWOOD.
Folding Basket.

No. 231,461. Patented Aug. 24, 1880.

2 Sheets—Sheet 1.

Witnesses.
L. F. Connor.
Arthur Reynolds.

Inventor.
Charles J. Underwood
by Crosby & Gregory
Attys.

(Model.)
C. J. UNDERWOOD.
Folding Basket.
No. 231,461.
2 Sheets—Sheet 2.
Patented Aug. 24, 1880.
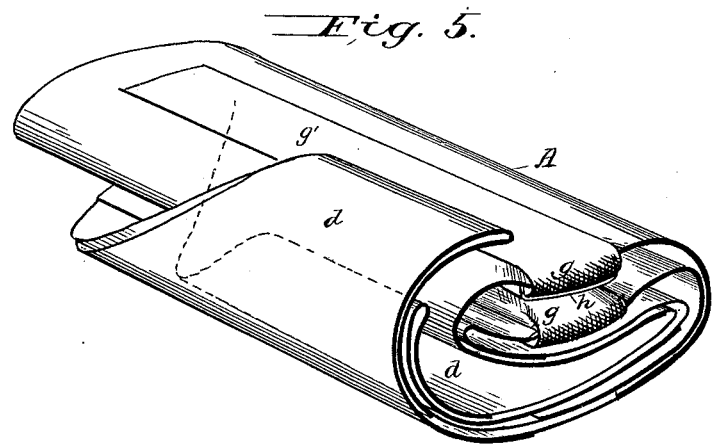
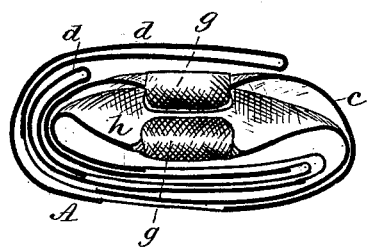
Attest
H. L. Browne
Harry D. Finckel
Inventor:
Charles J. Underwood
by associate attorney,
Wm. H. Finckel

UNITED STATES PATENT OFFICE.

CHARLES J. UNDERWOOD, OF BOSTON, MASSACHUSETTS.

FOLDING BASKET.

SPECIFICATION forming part of Letters Patent No. 231,461, dated August 24, 1880.

Application filed May 18, 1880. (Model.)

*To all whom it may concern:*

Be it known that I, CHARLES J. UNDERWOOD, of Boston, county of Suffolk, State of Massachusetts, have invented an Improvement in Baskets, of which the following description, in connection with the accompanying drawings, is a specification.

This invention relates to baskets, and has for its object the production of a folding or flexible basket, one which may be readily folded or shut up and be placed in the pocket in very compact shape, and which may be opened out or distended when it is to be filled with fruits, flowers, or other things.

My invention, as herein shown, is embodied in a basket made of paper of proper strength, it being creased so as to be readily folded, collapsed, or brought into a small or flat package, the said basket having a rigid but jointed handle, which may be folded down within the basket when the latter is to be folded, or straightened and held rigid and stiff when the basket is opened for use.

My invention therefore consists in a folding or collapsing basket as a new article of manufacture, the sides and bottom of the basket being composed of a flexible material, the basket being provided with a rigid jointed handle to operate as and for the purpose hereinafter described.

Figure 1:
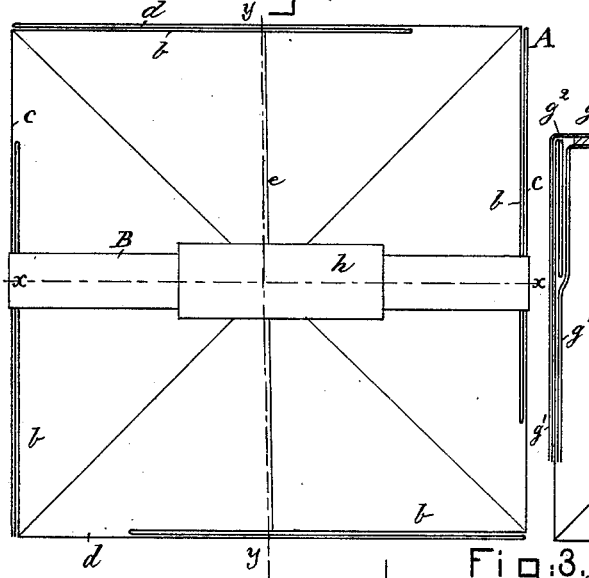
Figure 2:
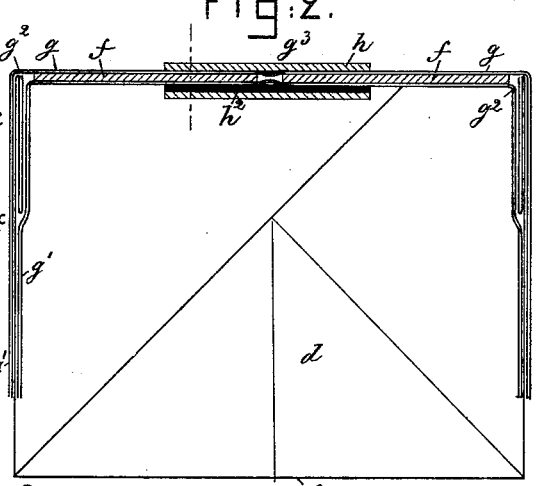
Figure 3:
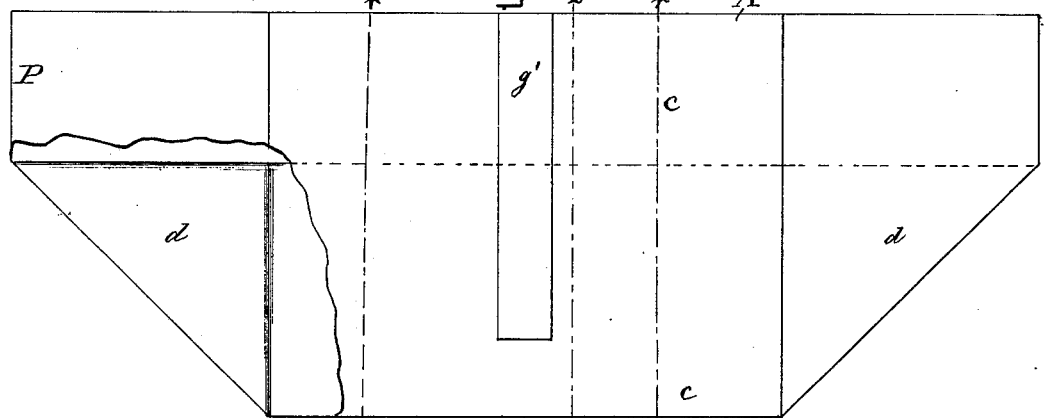
Figure 4:
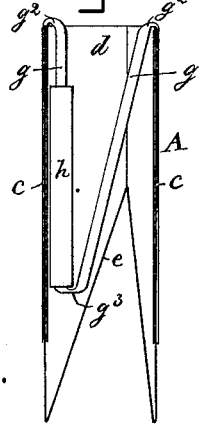
Figure 7:
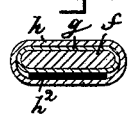

Figure 1 of the drawings represents, in top view, one of my improved baskets, made substantially square or rectangular, the basket being held open; Fig. 2, a vertical section thereof, taken through the handle, on the dotted line $x\ x$ of Fig. 1. Fig. 3 is a side elevation of the said basket, when folded together, on the dotted line $y\ y$, Fig. 1, the two ends of the basket being then distended and its bottom portion being folded upward along said line $y\ y$. Fig. 4 represents the folded basket shown in Fig. 3) as it will appear on the dotted line $z$ of said Fig. 3 the handle being shown as folded together. This Fig. 4 does not show the basket with its sides fully closed or in contact, as will be the case before the ends of the basket represented at the extreme right and left of Fig. 3 are turned over upon the sides of the basket with which the handle is attached, as in Fig. 6. Fig. 5 is a perspective view of my basket loosely folded. Fig. 6 represents the basket fully folded and ready to be placed in the pocket. Fig. 7 is a cross-section of the handle and its stiffening-loop on the dotted line made across the said handle in Fig. 2.

My improved basket A will preferably be made of paper, either of double or of single thickness, and coated or not within or without by a toughing or water-proof varnish, or treated in any usual way to add to the paper greater strength, or strength and flexibility.

It is obvious that instead of paper I may employ cloth or other usual material that will fold.

I prefer to make this basket substantially square or rectangular in shape when unfolded, as in Figs. 1 and 2; but it may be made of greater or less width or length, according to the purposes for which it is intended.

In making this basket I take a piece of paper of the proper size and shape and fold it on a square or other shaped former of proper size, pasting together the overlapping edges of the paper or other material, so that they shall strengthen the upper portion of the basket and leave the bottom of the basket seamless. These pasted-over portions, just referred to, at the sides and ends of the basket are represented in Fig. 1 by the triple lines marked $b$.

In the drawings, $c$ represents the sides of the basket, and $d$ its ends, and $e$ the bottom of basket. The handle B is composed of two pieces of wood, $f$, or other light but substantially-rigid material enveloped within a tube of paper, $g$, the ends of the said tube being cemented or otherwise properly secured to the sides of the basket. Preferably the ends of this tube $g$ will be split to make two parts, $g'$, (see Fig. 2,) one part being extended down within and along the inner portion of the side of the basket, and the other portion $g'$ being extended down along the outer surface of the side of the basket, the said pieces $g'\ g'$ adding strength and imparting stiffness to the basket at its sides. This paper tube $g$ forms a flexible hinge at the points $g^2$ for the handle part, to permit it to be folded within the basket, as in Fig. 4.

The ends of the rigid pieces within the tube $g$, near the center of the handle, do not touch together, and the portions $g^3$ of the said tube form a flexible center hinge or folding part or connection for the central part of the handle. I have placed upon this handle a sliding brace or stay, $h$, made as a loop, and composed, preferably, of paper or other strong material, the said loop being so held upon the handle that it may be slid into the position, Fig. 2, to brace the joint $g^3$ and make the handle rigid, so as to stay or hold out the sides of the basket and permit it, with its contents, to be carried by means of the said handle; or, if desired, the said loop may be moved longitudinally upon the handle until one of its ends passes beyond the hinge $g^3$, when the handle may be bent or folded at its center, as indicated in Fig. 4, thus permitting the handle to be folded within the basket preparatory to folding or collapsing the basket, as in Fig. 5. One portion of this loop $h$, preferably its under portion, will be stiffened by means of a piece of wood or other rigid material, $h^2$, (represented by the heavy black line in Figs. 2 and 7.)

When it is desired to fold the basket represented in Fig. 1 so as to place it in most compact form, the slide $h$ is moved so as to uncover the joint $g^3$ in the handle, after which I depress the handle within the basket, distend or move outward the ends $d$ of the basket, as represented in Fig. 3, and fold the bottom $e$ upward within the basket, as represented in Figs. 3 and 4.

When the sides $c\,c$ of the basket are brought substantially together, or as nearly so as the handle will permit, the ends $d$ are turned from the position, Fig. 3, into the position represented in Fig. 5, and thereafter the sides of the basket are folded along the dotted lines $r\,r$, making the small compact roll or package, as designated by Fig. 6, which may readily be slipped into the pocket and carried to market. With a basket of this kind, which does not take up any considerable space in the pocket, a person may be provided at any time, at market or at any other place, with a receptacle or basket for berries, fruits, flowers, &c.

This improved basket may be made, and is made, sufficiently strong to properly and safely carry all sorts of fruits and flowers, or, in fact, anything which is ordinarily carried in a paper parcel or market-basket.

Instead of forming the basket over a former, as described, the sides, ends, and bottom may be brought into the proper or desired shape by hand-folding or otherwise in any other of the ways now commonly practiced in the manufacture of satchel or square bottomed bags. Such ways, being well known, need not herein be further described.

I do not desire to limit myself to the particular way herein described of folding together the sides and ends of the basket, as it will be obvious to any one that it may be suitably creased and folded in other directions than that herein shown—as, for instance, the ends $d$ of the basket may be folded or brought inward toward the center of the basket, and the bottom $e$ of the basket be folded down or outward exactly opposite to the position occupied by the bottom of the basket in Fig. 4, and the bottom of the basket so turned outward may be folded upward against one side of the basket, after which the sides of the basket, with its ends so folded inward instead of outward, may be further folded substantially on the lines $r\,r$, making a compact roll, substantially as in Fig. 6.

I claim—

As an improved article of manufacture, a flexible and collapsible basket provided with a folding handle having a base of rigid material, to operate substantially as described.

In testimony whereof I have signed my name to this specification in the presence of two subscribing witnesses.

CHARLES J. UNDERWOOD.

Witnesses:
  G. W. GREGORY,
  N. E. C. WHITNEY.